(12) United States Patent
Kirby, Jr.

(10) Patent No.: US 8,499,031 B1
(45) Date of Patent: Jul. 30, 2013

(54) MARKUP LANGUAGE MESSAGING SERVICE FOR SECURE ACCESS BY EDGE APPLICATIONS

(75) Inventor: Josiah J. Kirby, Jr., Golden, CO (US)

(73) Assignee: Oracle America, Inc., Redwood City, CA (US)

( * ) Notice: Subject to any disclaimer, the term of this patent is extended or adjusted under 35 U.S.C. 154(b) by 2371 days.

(21) Appl. No.: 11/255,251

(22) Filed: Oct. 21, 2005

(51) Int. Cl.
*G06F 15/16* (2006.01)

(52) U.S. Cl.
USPC .......................................... 709/203; 719/315

(58) Field of Classification Search
USPC ......................................................... 709/200
See application file for complete search history.

(56) References Cited

U.S. PATENT DOCUMENTS

| | | | |
|---|---|---|---|
| 6,772,216 B1 * | 8/2004 | Ankireddipally et al. | 709/230 |
| 2002/0026447 A1 * | 2/2002 | Matsutsuka et al. | 707/103 Y |
| 2002/0038335 A1 * | 3/2002 | Dong et al. | 709/203 |
| 2002/0091533 A1 * | 7/2002 | Ims et al. | 705/1 |
| 2002/0169842 A1 * | 11/2002 | Christensen et al. | 709/206 |
| 2003/0018916 A1 | 1/2003 | Smith et al. | |
| 2003/0088771 A1 * | 5/2003 | Merchen | 713/175 |
| 2003/0105806 A1 * | 6/2003 | Gayle et al. | 709/203 |
| 2003/0172296 A1 | 9/2003 | Gunter | |
| 2003/0191803 A1 * | 10/2003 | Chinnici et al. | 709/203 |
| 2003/0208595 A1 * | 11/2003 | Gouge et al. | 709/225 |
| 2005/0063333 A1 | 3/2005 | Patron et al. | |
| 2005/0097061 A1 | 5/2005 | Shapiro et al. | |
| 2005/0172033 A1 | 8/2005 | Mathew et al. | |
| 2005/0198348 A1 | 9/2005 | Yeates et al. | |

* cited by examiner

*Primary Examiner* — Dustin Nguyen
(74) *Attorney, Agent, or Firm* — Marsh Fischman & Breyfogle LLP; Kent A. Lembke (57) ABSTRACT

A method and corresponding system for secure messaging between an edge application and internal business process. The method includes converting a client request in an object state into a network message, e.g., a markup language message, based on a data definition. A network connection is opened and the network message is transmitted from the edge application to a messaging application associated with the internal business processes, which maps the network message is mapped to one of the business processed based on the type of data object or object state of the network message. The network message is converted back to its original state using the data definition, and the converted network message is passed to the mapped business process for processing to create a response or response data object. The mapping step typically includes reading a configuration file that defines pairings between data object types and business objects.

20 Claims, 3 Drawing Sheets

MARKUP LANGUAGE MESSAGING SERVICE FOR SECURE ACCESS BY EDGE APPLICATIONS

BACKGROUND OF THE INVENTION

1. Field of the Invention

The present invention relates, in general, to secure messaging and transfer of digital data in a computer network such as a multi-tier enterprise system with one or more firewalls protecting applications and data from unauthorized access via an exposed edge (e.g., a presentation application running at an edge exposed to the Internet or other publicly-accessible network), and, more particularly, a method and corresponding system for providing messaging in a secure and efficient manner between a client tier application, such as a presentation application or service provided at the edge of the network or system, and a business tier application(s), such as a business application or business logic that manages and manipulates data (i.e., business critical or confidential data, private customer data, or other data that needs protection from unauthorized access).

2. Relevant Background

The rapid growth in networked and distributed computers and wired and wireless digital communications has led to a rapid growth in the need for accessing data and applications running on more secure computer systems and local networks. For example, an increasing number of employees work remotely from their employer's facilities including their employer's computer networks. These employees need to be able to remotely access the computer networks and the data available on such networks and applications running on the networks. Similarly, there are numerous e-commerce and Internet-based businesses that are operated such that customers need to be able to access data and applications that are protected behind firewall and other security services.

As a result, corporate enterprises need safe and secure architectures that enable deployment of applications on the edge, i.e., facing or exposed to a public network such as the Internet. The architecture and its messaging services or techniques need to be selected such that the edge application can be deployed (e.g., provided to remote employees, customers, and the like) without jeopardizing internal corporate resources including data and applications accessed via the edge application. For example, an edge application may be deployed to allow remote employees to input their time, and it is important that the employee records and time cannot be accessed by unauthorized third parties that may copy, alter, or destroy the confidential and business-critical information.

Existing messaging methods have provided secure messaging but have created many inefficiencies and complicated architectures. In many architectures, secure messaging is provided by transferring information in the form of a markup language document (e.g., an eXtensible Markup Language (XML) document) that is transmitted or "tunneled" via network protocols such as HTTP (HyperText Transfer Protocol) or HTTPS (HyperText Transfer Protocol Secure), which are standard methods of transferring information across the Internet and World Wide Web. For example, a presentation application may be developed with numerous XML documents (which may be provided as web pages by a browser) for collecting information that is then transferred through one or more firewalls to an internal business application that converts the XML to its native programming language, e.g., Java, C+, or the like. Once the application is completed with processing (such as generating a response), the business application converts its output or response into an anticipated XML document that is transferred back to the requesting client or application through the firewall or firewalls. Such architectures are undesirable because they require developers of both the edge applications and business applications to understand and implement the markup language, such as XML, instead of being able to concentrate or focus on only the presentation or business logic.

The existing enterprise architectures also create problems for organizations that wish to use an internal application in an edge environment. In many cases, applications are built initially to operate strictly on internal, secure networks where secure messaging is not a concern. If the enterprise decides that it would be desirable to allow remote access of the application and its data, significant re-engineering is required to migrate the application to an edge environment. Specifically, a developer would need to provide numerous interfaces, such as XML schemas, for each piece or set of data that is to be presented or collected at the edge or Internet access point so that the application can securely transmit or tunnel information through security services and/or firewalls.

Due to these and other limitations of existing technologies, there remains a need for an improved method and system for providing secure messaging from an edge application, such as logic or applications on a client tier, to an internal application, such as logic or applications on a business tier. Preferably, such a method and system would be compatible with existing (and yet to be developed) security services and firewall technologies including network transfer protocols.

SUMMARY OF THE INVENTION

The present invention addresses the above and other problems by providing a method and corresponding system for providing secure messaging between two applications, such as an application presented at an edge of a network and an application running within a secure or internal network behind a firewall or two and/or a security service. Briefly, the internal application is initiated with a configuration file that defines mapping between data object types expected in incoming messages or requests and business processes or objects that will process each data object type. The edge application is configured to process a client request (such as one with standard HTTP/HTTPS parameters) to create a data object and then, call an encoder to encode the data object as a message for transfer over a network connection to the internal application.

For example, the message may be formatted as an eXtensible Markup Language (XML) document using a data definition. A security service may be provided to validated the XML or other network message and when validated, pass the message to the destination, i.e., the internal application. The internal application uses the mapping defined in the configuration file to pair the request data object in the XML message to an appropriate business process or object. The XML message is converted back to its original data object state and passed to the mapped or identified business process or object, which processes the request data object and generates a response data object. The response data object is then converted into a form for network transfer, e.g., an XML message using the single data definition, and then transferred to the edge application. The edge application in turn converts the response XML message back into its original response data object that it processes to generate a response for transmittal to the requesting client. In this manner, a single data definition can be used by the edge application and internal application during conversions of requests and responses into messages for transfer over a secure network, and also, the edge or "presentation" application and business processes or objects can be developed without concern for transmittal requirements with emphasis placed on processing data objects.

More particularly, a method is provided for secure messaging between two applications (e.g., between an application on a client tier and an application or one or more business objects on a business tier). The method includes, with a first application, converting a client request in an object state (or in the form of a data object) into a network message based on a data definition. For example, the network message may be a markup language message or document, e.g., an XML message that conforms to a particular document type definition (DTD). The method further includes opening a network connection between the first and second applications and transmitting the network message to the second application (with, in some cases, a security service being provided between the two applications to validate the message and/or perform other security actions).

With the second application, the network message is mapped to a business process. The network message is converted back to its original state using a decoder, i.e., back to the client request having the particular object state. The converted client request or network message is passed to the mapped business process for processing to create a response or response data object. The mapping step typically includes reading a configuration file that defines a plurality of pairings between data object types and business objects (or their identifiers or names), determining the data object type of the received network message, and retrieving the identifier/name of one of the business processes based on the data object type. The response data object is then converted into a response network message using the data definition and transmitted back to the first application, where it converted back into its original data object state for use by the first application in creating a response to send to the requesting client.

DETAILED DESCRIPTION OF THE PREFERRED EMBODIMENTS

In brief, the invention is directed to messaging methods and systems that allow developers to create applications that can run strictly on internal environments or that can be deployed in an edge environment without requiring re-engineering of the application to comply with security requirements or data transfer protocols. The messaging service of the invention does not require the developer to know a markup language, such as eXtensible Markup Language (XML), or to construct data definitions or schemas according to such a language. The messaging service, which is sometimes referred to as a firewall messaging service or X-Cross Firewall Messaging Service (XMS), enables the developer of a presentation application (i.e., an application on the client tier or edge) and the developer of a business or internal application (e.g., an application running on a secure or internal network such as a local area network (LAN) or wide area network (WAN)) to implement their applications using a common programming language, such an object oriented language (e.g., Java or the like).

Significantly, the messaging service is adapted to map data objects from the presentation or edge application to business applications or objects. Secure messaging or data transmissions are achieved through the use of encoder/decoder pairs that encode messages from the edge application into a markup language so that the message can be transmitted using common network protocols (e.g., tunneled with HTTP or HTTPS or the like) and processed by a security service. The received markup language message is mapped to a data object (or an error message is generated if mapping is unsuccessful) and decoded into its original form. The business application processes the request or message and outputs a data object that is encoded into the markup language form for transfer to the edge application where it is decoded and provided to the requester or client. In one embodiment, the secure messages are transmitted as XML documents or messages that are created on the fly from the request and response messages or data objects generated by the edge and business applications or objects. The messaging service and system provide a framework to transport an XML document via HTTP/HTTPS tunneling. In a Java example, the messaging service or method allows developers to encapsulate HTTP request/response attributes into Java objects (e.g., Java beans) that are then converted to XML for data transport.

Figure 1:
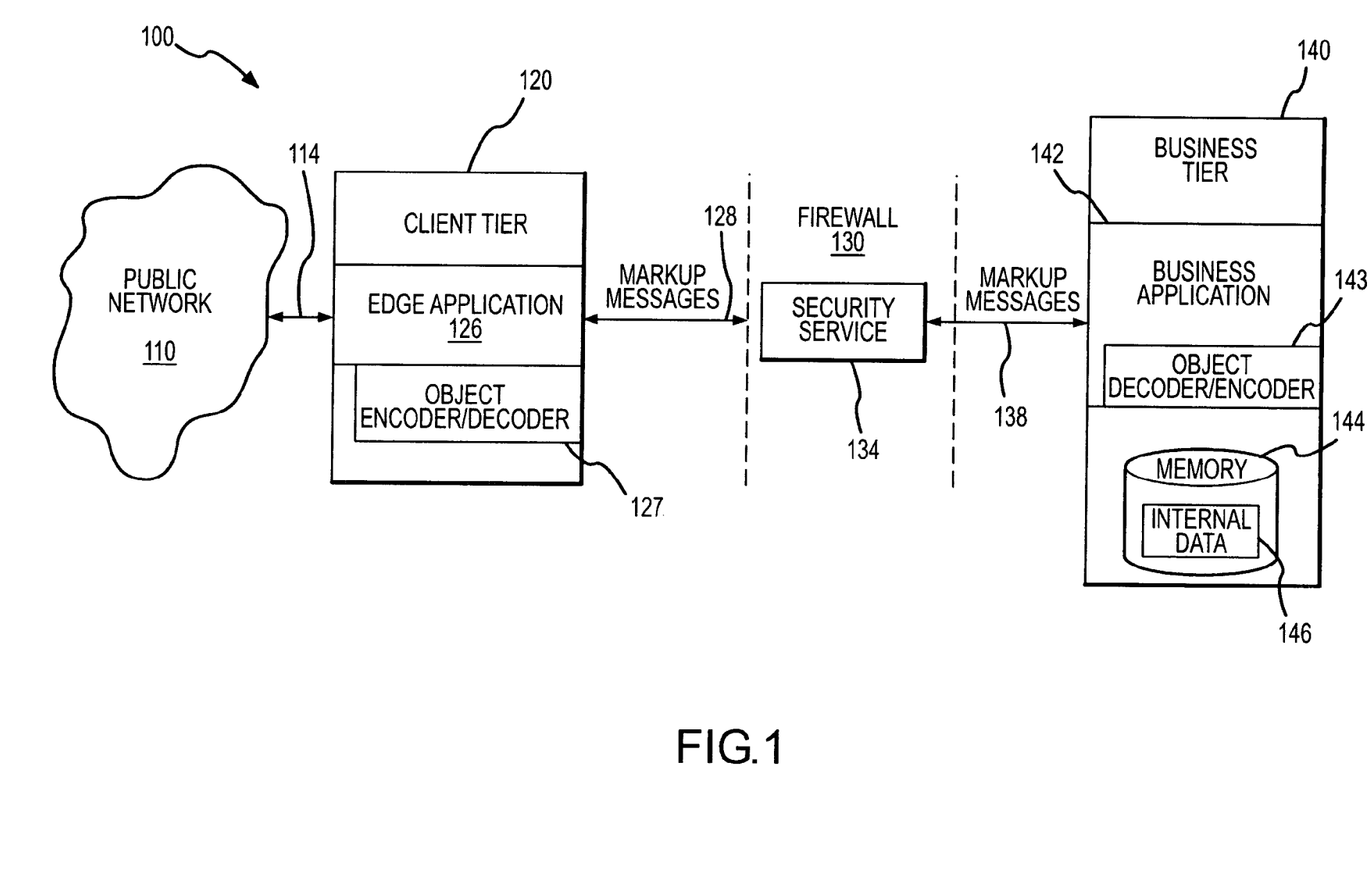
FIG. 1 illustrates in block diagram form a multi-tier computing architecture or system according to the present invention.
Figure 2:
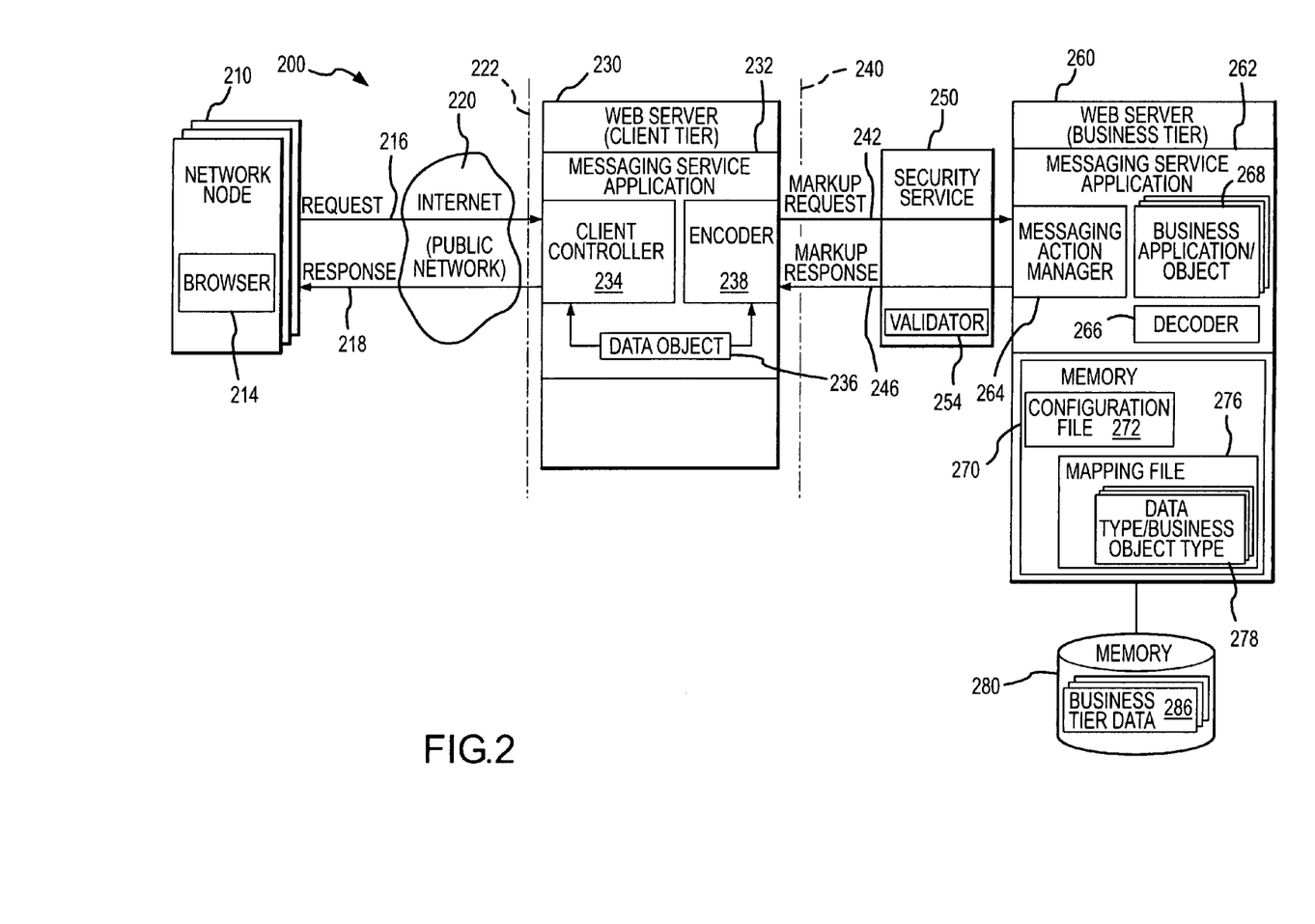
FIG. 2 is a block diagram illustrating a messaging service system of the present invention with more detail than FIG. 1 showing use of markup language encoders and decoders along with a mapping file to provide improved, secure messaging in an architecture having an edge application.
Figure 3:
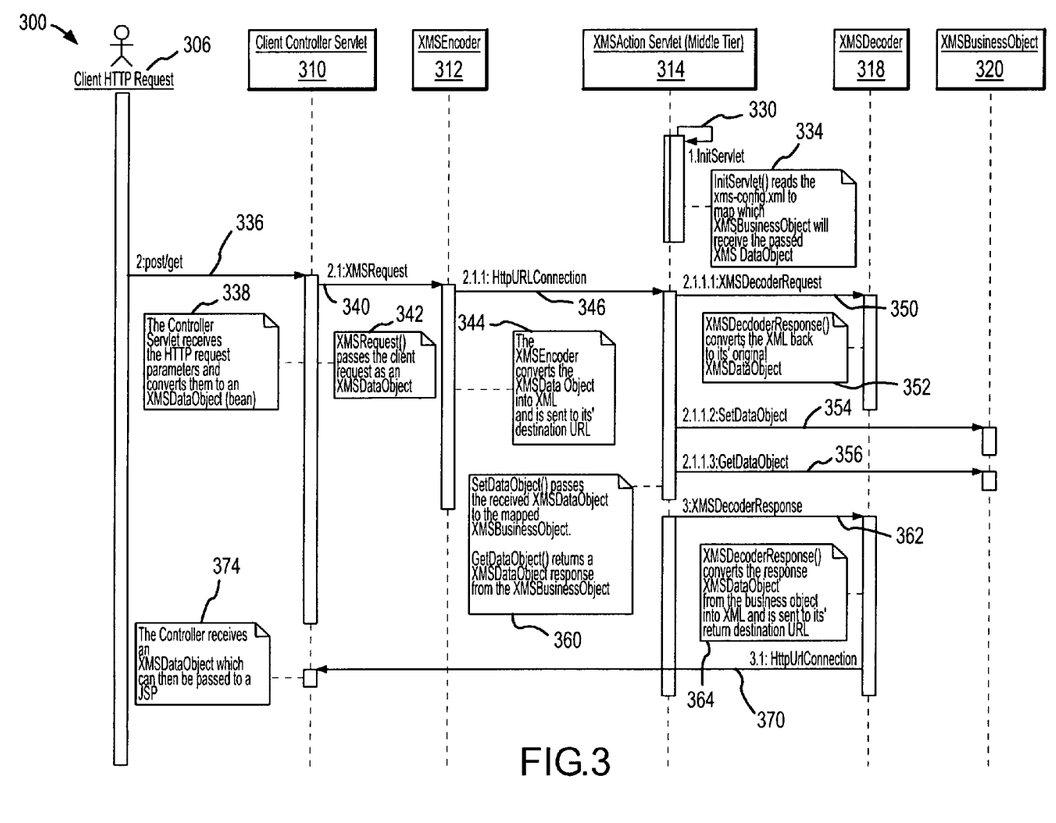
FIG. 3 is a sequence or flow diagram of messaging process according to an exemplary embodiment of the present invention, such as may be implemented by operation of the systems or architectures of FIGS. 1 and 2.

In the following discussion, computer and network devices, such as the software and hardware devices within the systems 100 and 200, are described in relation to their function rather than as being limited to particular electronic devices and computer architectures and programming languages. To practice the invention, the computer and network devices or elements may be any devices useful for providing the described functions, including well-known data processing and communication devices and systems, such as application, database, web, blade, and entry level servers, midframe, midrange, and high-end servers, personal computers and computing devices including mobile computing and electronic devices with processing, memory, and input/output components running code or programs ("applications", "tasks" within such applications, and "services") in any useful programming language, and server devices configured to maintain and then transmit digital data over a wired or wireless communications network. Further, data storage systems and memory components are described herein generally and are intended to refer to nearly any device and media useful for storing digital data such as disk-based devices, their controllers or control systems, and any associated software. Data, including transmissions to and from the elements of the network 100, 200 and in process 300, typically is communicated in digital format following standard communication and transfer protocols, such as TCP/IP, HTTP, HTTPS, FTP, and the like, or IP or non-IP wireless communication protocols.

FIG. 1 illustrates an exemplary firewall messaging system 100 according to the present invention. The system 100 illustrates on a high level the invention as it may be implemented in a multi-tier environment. As shown, a client tier 120 faces or is exposed to a public network 110, which may be the Internet, a different public network, or a less public communications network (such as a WAN or LAN in which users do not have general access to all applications or resources) with messages 114, such as requests and responses, being transmitted between the network 110 and the client tier 120. The client tier 120 may be provided as part of an enterprise computer system or network, such as on one or more servers or other network devices.

A client application 126 is provided in the client tier 126 to communicate with the network 110. These communications may include presenting data, such as web pages, to a node (not shown) on the network 110 and receiving requests and in return, providing responses. According to an important aspect of the invention the messaging system 100 is configured to allow secure communications between the client tier 120 and a business tier 140 that is positioned behind a firewall 130 and security service 134. To this end, the edge application 126 typically presents an interface accessible from the network 110 that is in a standard form used by application developers, such as an object-oriented coding language such as Java or the like. The edge application 126 includes a data object encoder/decoder 127 which operates generally to encode a message, such as a request from the network 110 or generated from the presented edge interface, as a markup message, such as an XML message 128 that can be transmitted using standard network communication protocols such as HTTP or HTTPS through the firewall 130 and processed by security service 134. For example, the security service 134 may include an XML or other markup language validator to validate the form and content of the message 128 as well as performing other security processing of the message 128. The encoder/decoder 127 further functions to process markup languages 128 received by the edge application 126 to decode the messages 128 to a form or state for presenting to the network 110 (such as back to a data object, e.g., a Java bean or the like).

Messages 138 that are validated and/or otherwise determined to be acceptable for internal distribution behind the firewall 130 are transmitted to the business tier 140 which receives the messages 138 with a business application 142. As with the client tier 120, the business tier 140 may be provided on one or more computer or network devices, such as one or more servers or network devices provided in a network (e.g., a WAN, a LAN, or the like). The business application 142 processes the received markup message 138 to determine if it is an expected or accepted type of message by attempting to map or pair it with a business process or logic running as part of the application 142, such as a business object or business object type. If a match is found, the message 138 is mapped to a business process or object that is called or loaded by the application 142 to process the message 138, e.g., the request 138.

Prior to passing the message 138 to the mapped or paired business process or object, the message 138 is decoded by the object decoder/encoder 143 to convert the markup message (e.g., the XML message) into a form expected by the business process or object. In a Java embodiment, the converted message may take the form of a data object or a bean. To process the data object or bean, the application 142 or the business process or object mapped to the message may access memory or database 144 which is storing internal or protected data 146. The generated response or output from the mapped business process or object is then converted by the object decoder/encoder 143 and transmitted as markup message 138 to the firewall 130 and security service 134, which transmit it as message 128 to the edge application. The object encoder/decoder 127 is then used to convert the markup language message 128 (e.g., XML message) back to a form useful to the edge application and by a node or application accessing the edge application via the network 110, such as converted to a data object form (e.g., to a Java bean).

As can be understood from this discussion of FIG. 1, the messaging system 100 (and messaging services or methods performed during its operation) is a Web service framework designed to enable an edge-based application 126 to communicate with secure corporate resources, such as those in business tier 140. In an XML-based embodiment, the XMS 100 provides a framework to transport an XML document 128, 138 between the edge application 126 and a business application 142, with such transport being performed via network protocol and methodologies such as HTTP/HTTPS tunneling. During operation of the XMS 100, XML 128 generated dynamically by the object encoder/decoder 127 can be forwarded to an XML-based security service 134 and then as message 138 to its secure internal resource in business tier 140.

In specific Java implementations of the invention, the XMS 100 allows developers to encapsulate HTTP request/response attributes into Java beans with edge application 126 and logic in business application 142 that are then converted to XML for the underlying data transport as markup messages 128, 138 through firewall 130 and security service 134. The mechanisms 127, 143 used to convert requests and responses from data objects to XML may be based on the Java XMLEncoder and XMLDecoder classes (e.g., JDK 1.4 or higher). Extension of these Java classes is useful to implement the system 100 as it allows Java beans generated by applications 126, 142 to be converted into XML based on a single definition, such as a single DTD (Document Type Definition) rather than a plurality of XML schemas. The invention, as discussed above with reference to XMS 100 and in more detail below with reference to FIGS. 2 and 3, provides functionality to convert the XML back to its object state. As will become clear from the discussion of FIGS. 2 and 3, the invention also provides functionality to handle event synchronization and HTTP session management between tiered processes. The XMS 100 greatly simplifies the development and management of edge-based applications, such as application 126, and requires only a few API calls to implement. The XMS 100 also does not require a developer to know XML as was the case with many prior architectures, but instead, in the XMS 100 a developer only needs to know how to send and receive data objects or beans (i.e., XMS-based data objects or beans).

FIG. 2 illustrates in more detail a messaging system 200 configured according to the present invention for dynamically generating markup language messages (such as from data objects) with two applications to allow the applications to communicate in a secure manner, even though one may be presented at the edge and the other within a private or internal network. The system 200 includes a web server 230 that can be considered in the client tier and that faces the Internet 220 (or other public or non-private network). A network node(s) 210 can access a messaging service application 232 via an optional firewall 222, i.e., the messaging service application 232 in the client tier is an application presented on the edge of system 200. The node 210 employs a browser or other mechanism 214 to communicate requests 216 and to receive responses 218 over the Internet 220 to the web server 230 and messaging service application 232. For example, the messages 216, 218 may be transmitted according to the HTTP, the HTTPS, or other protocol for communicating over the Internet 220.

The messaging service application 232 is presented on the edge of system 200 in a client tier web server 230. The application 232 is shown to include a client controller 234 that receives messages/requests 216 and returns messages/responses 218 to the requesting node or client 210. The client controller 234 processes the request 216 and generates a data object 236 that it provides to the encoder 238 (or that it provides in a call of encoder 238). The encoder 238 then processes the data object 236 to create a markup request (such as an XML message) 242 that is transmitted by the messaging service application to a messaging service application 262 on a business tier or internal web server 260 (such as a server in a secure WAN, LAN, or other network) via firewall 240 and security service 250.

The messaging service application 232 may be coded in a variety of programming languages to practice the invention with a significant feature of the invention being that the application 232 can be coded in well-know languages and form to facilitate development but yet generate, transmit, received, and convert/decode markup messages 242, 246. The following discussion describes an embodiment of the system 200 configured using Java, but this is not considered a requirement or limitation.

The client controller 234 may be provided as a servlet and is considered an "external" in the system 200 but is an important component of the system 200. The client controller 234 provides a service to capture client requests 216, process the requests 216, perform session management, provide page access, and render content. For the system 200, the client controller 234 is responsible for taking the requests 216, e.g., HTTP requests, and constructing a data object 236 that are passed to encoder 238. The client controller 234 may also handle responses from the security service 250 and/or from the processes of the messaging service application 262 in business tier web server 260. As will be appreciated by those skilled in the art, struts may be used in implementing the client controller 234 as struts provide a good framework for handling these tasks because struts provide its own controller servlet. The messaging service 200 data object 236 can be implemented as a struts ActionForm, which handles the creation of HTTP request parameters into the form of a Java bean.

In preferred embodiments, the data object 236 provides an interface that is used to create messaging service data beans (e.g., a Java class with set and get methods). The interface of the data object 236 may include the following methods: setXmsSession, which is a method that sets the HTTP Session value of the business tier process; getXmsSession, which is a method that gets the HTTP Session value of the business tier process; setMessage which sets a message; and getMessage, which gets a message (with the names of the methods not being significant to the invention).

A data bean, such as data object 236, is a representation of a request or responses action values. For example, if a user is presented via browser 214 with a login page by the client controller 234, they typically need to input their user name and password. When this form is submitted to a the messaging service application 232, the controller servlet 234 takes these parameters and "assembles" them into a data bean 236, which implements the interface described above. In this example, a myLogin class may be created implementing the data object interface with the following additional methods: setUserName; getUserName; setPassword; and getPassword. With the names of these methods explaining their functionalities. The controller servlet 234 then uses the appropriate "set" method to assign the passed form parameter. The myLogin object is then used by messaging service application 232 to create, with encoder 238, a markup language representation (e.g., an XML representation) of its state. Likewise, the decoder 266 provided as part of the messaging service application 262 in the business tier web sever 260 takes the XML or other markup language representation and converts it back to its original state. Components of the XMS 200 use the "get" methods to access the data.

The encoder 238 functions to convert the data object 236 into markup language (such as XML) for transmittal as request 242. To this end, the encoder 238 may be implemented as an extension of the XMLEncoder class available in Java development kits (such as JDK 4.1 or higher), which enables the encoder 238 to convert passed data objects 236 in the form of data beans into XML (e.g., via java.beans.XMLEncoder). Significantly, the encoder 238 can perform the conversion of data object 236 (e.g., a Java bean) with a single data definition. In one embodiment, a single DTD is cached or stored in memory (not shown) on server 230 or accessible by application 232 and is used by the encoder 238 to perform the conversion to markup request 242.

The encoder 238 also creates a connection with the security service 250 (or directly with the web server 260 in implementations in which the two applications 232, 262 are provided on the same machine or within a secure network on differing machines/devices). Typically, the connection is made through standard HTTP/HTTPS "plumbing" calls. The encoder 238 further checks HTTP response code to make sure there were no errors in the connection. If an HTTP response code other than HTTP_ACCEPTED or HTTP_OK or other message indicating successful connection is received, the encoder 238 generates an error back to the client 234 and/or requesting node 210.

According to another aspect of the invention, the XMS 200 is preferably implemented to keep state, which is often a problem with XML messaging, so that the applications 232, 262 can maintain synchronization. To this end, the encoder 238 may further function to cache the business tier's session value (e.g., caches a secure WAN tier's servlet session value). In this way, during the next session request, the encoder 238 can retrieve the cached session value and append it to the HTTP connection URL to evoke URL rewriting on the SWAN tier process. This is how state is maintained in the XMS 200. To make this work, the servlet container on the WAN or business tier should have URL rewriting turned on, which is the default. Further, the encoder 238 may use URL (Universal Resource Locator) rewriting to the security service 250 to send/receive markup language requests and responses 242, 246 (e.g., XML messages). Yet further, state may be maintained or managed in the XMS 200 by sending cookies via HTTP headers. This allows one to add additional information for the business tier and, optionally, to use in substitution of URL rewriting. Many Java-based applications use cookies (e.g., cookies carried through HTTP headers) in lieu of URL rewriting, and hence, it may be useful in some applications for the XMS 200 to support one or the other or both of these methods of state maintenance.

The encoder 238 also converts received XML or markup language messages/responses 246 back to an object state, i.e., data object 236, for return to client controller 234 and network node 210 as response 218, with or without further processing by client controller 234 or other presentation logic in application 232. Similar to encoding, this may be achieved by extending the Java XMLDecoder class available in JDK (such as JDK 1.4 or higher) to process the response 246. The encoder 238 also adds custom element tags (e.g. DOCTYPE) to the XML or markup request 242 that may be needed by the security service 250 to perform validation with validator 254. This feature is also extensible so future elements can be added. As can be seen from this discussion of the messaging service application 232, the development of presentation pieces or portions of the client tier is greatly simplified as a developer only has to use a single API or similar call to access or communicate with applications or logic in the business tier of XMS 200.

The security service 250 is provided behind or as part of firewall 240 to ensure that only authorized or accepted access of messaging service application 262 is allowed in the XMS 200. As shown, the XMS 200 is designed to work with HTTP, HTTPS, or other network protocols and is particularly suited for e-commerce or similar networks/systems that utilize multi-tier topologies that are protected by firewalls 222, 240. The nature of markup language messaging, such as XML messaging, is a "clear text" presentation of data in a structured document that can be validated by a validator 254 of the security service 250 suing either a DTD or schema or other data definition. The XML or other markup language messages are used in the XMS 200 only to represent request information/incoming messages 242 and response information/outgoing messages 246 (e.g., HTTP request and response information). The security service 250 may be implemented using a variety of presently available applications (such as Secure Data Broker from Sun Microsystems, Inc., Cross Firewall Messaging (CFM) from Westbridge Technology, or the like) or a security service that has yet to be developed but that provides appropriate functionality. The security service 250 validates and provides other security checks (such as content, source, and the like) the XML request 242 before allowing its payload to be forwarded to its destination 260 and application 262.

When validated and otherwise determined an allowable access, the markup language request 242 is allowed to pass to the messaging service application 262 on web server 260. The application 262 includes a messaging action manager or servlet 264, a decoder 266, and one or more business applications or objects 268. The action manager 264 is the gateway and controller for the business tier of the messaging service 200. To allow the client tier and application 232 to communicate with the action manager 264, the client application 232 (or encoder 238) or security service 250 uses/knows the URL of this servlet or manager 264 when forwarding its XML or markup payload as request 242. In alternative embodiments, the client tier and business tier are provided within a secure or internal network or device and a security service is not used. In these "internal" embodiments, the client tier's target URL setting (such as web.xml setting) is set to the action manager 264 URL. This means an XMS-enabled application can be deployed first on a secure device or network (such as internal WAN or LAN), and then later migrated to the edge by just changing a web.xml or target URL setting.

The action manager 264 handles all of the controller functionality. These functions include managing the HTTP connections with the security service 250 (or directly with the client tier 230 if a security service 250 is not used). Significantly, as is explained in detail below, the action manager 264 maps received data objects to their appropriate business objects 268. Further, the action manager 264 performs session management and error trapping in the event the session times out or an exception is thrown in the business object 268 layer. The action manager 264 handles all of the various "plumbing" issues of managing the connections to the client tier 230 which frees up a developer(s) of applications for the business tier to focus on the business/data components 268. During operation of the system 200, the action manager 264 receives a request 242, validates the session, validates the request 242, and then forwards the message to the appropriate business object 268.

The action manager 264 is configured to know where to forward its requests 242 from the client tier application 232. To this end, memory 270 is provided on (or is accessible from) server 260 and a configuration file 272 is stored in the memory 270. At initialization, the action manager 264 reads the configuration file 272, which pairs or matches a data object type to a corresponding business object type. This "mapping" of data from client or edge application 232 to a business object 268 is stored as a mapping file in cache or memory 270. Then, during operation of XMS 200, upon receiving a data object (i.e., a markup request 242 that has been converted from markup form to its original state as a data bean or the like), the action manager 264 examines the data object to determine if the data object type can be mapped. If found or paired based on an inspection of mapping file 276 with its pairings of data types to object types 278, it returns the name of the business object 268 to load. The action manager 264 then dynamically loads the mapped business object 268 and forwards the data object for processing to the business object 268, with a unique feature being that within the XMS 200 the business object 268 is dynamically loaded/initialized and then called. If not found or unable to map based on inspection of mapping file 276, the action manager 264 generates an error back to the client tier and application 232.

After the business object 268 completes its processing, the business object 268 returns to the servlet or action manager 264 its output, e.g., a response in the form of a data object (or data bean in Java embodiments). The data object is then converted to XML or markup response 246 by the decoder 266 and returned to the client application 232 by the action manager 264 (or directly from the business object 268). The processing by the business object 268 may include accessing of memory 280 and business tier data 286 or other resources available in the business tier or internal to the messaging system 200.

Because the use of the configuration file 272 to generate mapping file 276 is an important aspect of the invention, it may be worthwhile to more fully describe one exemplary implementation. The XMS configuration file (e.g., xms-config.xml in one embodiment) 272 is deployed in the business tier and server 260 to define a mapping of a client tier request 242 and its corresponding data object to its corresponding business object 268. Every data object-based request 242 generated by the client tier application 232 must be mapped to a corresponding business object 268 (or an error is generated). This means the client tier needs to coordinate with the business tier to agree upon a mapping scheme for use by the action manager 264 via mapping file 276. Such a mapping technique provides a number of benefits including: tighter security to only allow "known" data objects to operate in XMS 200; easily adjustment of application work flow; provides the ability to allow client and business tiers to develop independently; and simplification of the integration of client tier requests/responses with the business tier.

In one embodiment, the configuration file 272 has the following elements, which may be defined in its DTD or other definition method: (a) a root element (e.g., xms-config); (b) action mappings that describe a set of data objects that are available to process to a corresponding business object, with the individual mappings being configured through nested <action> elements in some implementations; (c) an action that describes a data object that is to be used to process a corresponding business object; (d) a data type that may be a fully qualified Java class name of the data object subclass that will process requests for this action mapping; and (e) a business object type that may be a fully qualified Java class name of the business object subclass that will "receive" the XMS data object. This or a subset of this information is stored in a mapping file 276 as element 278 and that can be accessed by action manager 264 when a new markup request 242 is received to perform mapping or pairing of a received data object with an appropriate business object 268 (as is explained further with reference to FIG. 3).

The decoder 266 is provided mainly to convert the markup request (e.g., XML message) 242 back to a state useful to a corresponding business application 268, such as to a data bean or object state when the business application is a Java or object-oriented programming language object. In Java-based implementations of XMS 200, the decoder may extend the XMLDecoder class (e.g., java.bean.XMLDecoder in JDK 4.1 or higher). The decoder 266 typically gives a class name (or type) of the received data object, which is used by the action manager 264 in mapping the data object to a business object by searching mapping file 276 records or elements 278. Additionally, the decoder 266 typically is configured to perform some or all of the following duties: (a) check to make sure the business tier web server 260 has URL rewriting turned on otherwise generate an error; (b) generate XML response 246 and validate it against a document type definition (e.g., a DTD selected for implementation in the XMS 200 to define the requests and responses 242, 246) which may be implemented as a subset or modification of the javabeans.dtd that is provided with java.beans package; and (c) remove custom elements (e.g., DOCTYPE) added by the encoder 238 (this is useful in some Java-based implementations because the decoder 266 calls underlying XMLDecoder methods that use the javabeans.dtd to validate the XML 246 generated by the decoder 266).

Each of the business objects 268 can be thought of as an interface which all business logic or application components in the business tier 260 need to implement to be mapped to a data object from the client tier application 232. In one object-oriented implementation, the business objects or interfaces 268 include the following methods: a set data object method that is called by the action manager or servlet 264 to pass the data object received in the markup request 242 and a get data object method that gets the business object 268 processing results in the form of a data object, e.g., a data object complying with a data definition used within the XMS 200 (such as a shared DTD or the like). The set data object method is where business tier developers typically originate their business processing logic. The get data object method is where business tier developers put the output of their business processing.

Errors or error objects may be used to format and transport errors/exceptions trapped by operation of the XMS 200. Client tier components 232 that make request calls 242 with the encoder 238 preferably check first for the returned data object type 246 to see if it is an error. If it is a error, the application 232 takes appropriate error handling measures. Details to the nature of the message are determined such as via a get error type or similar method (not shown) that may be called by encoder 238 or client controller 234.

FIG. 3 illustrates a method 300 of messaging or supporting communications between two applications, and particularly, a client tier (or edge) application and a business tier (or other "internal") application. The messaging method 300 illustrates in more detail the actions taken by and interactions between a client controller servlet 310, an XMS encoder 312, an XMS action servlet 314, an XMS decoder 318, and an XMS business object 320 in response to (or as part of handling) a client request or incoming message 306 (e.g., a client HTTP/HTTPS request or the like). The messaging method 300 provides session and event management, provides connectivity/communication between "separated" application processes, simplifies application development and management, dynamically converts a Java bean or other data object into a markup language (such as XML) message or document and later converts such markup language messages back to their object states, and efficiently maps workflow presented by incoming requests or data objects to business objects using a configuration file (or a mapping file cached after reading such a configuration file).

At start up 330 or initially, the action servlet 314 reads a configuration file that contains a mapping of expected data object types to their corresponding business objects. In other words, the configuration file provides information as to which business object 320 will receive a particular data object received as part of a client request 306, when the data object is passed to the action servlet 314. At 336, functional method flow starts from a client with the client HTTP request 306 being received by the client controller servlet 310. At 338, the controller servlet 310 processes the HTTP request parameters and converts or assembles them into a data object or data bean. The controller servlet 310 then passes or forwards the data object at 340, 342 (such as with an XMSRequest method or the like) to the XMS encoder 312. At 344, the XMS encoder 312 converts the data object into a markup request (e.g., into XML).

As shown at 346, a URL connection is established, and the XML request or message is sent to its destination URL, such as using HTTP/HTTPS tunneling to send its payload to the destination URL. In a network that includes a public edge (such as those shown in FIGS. 1 and 2), the destination URL is typically a security service (not shown in FIG. 3), where the XML message is validated and further processed according to security rules. If an error occurs during such validation, the security service sends back an error message which is intercepted by the controller servlet 310. If validation is made (and other security processes are successful), the security service forwards the XML request or message to the appropriate business process, i.e., to XMS action servlet 314, which handles all of the requests from the client tier or edge.

The XMS action servlet 314 is the gatekeeper to the business processing end of applications which are interfaced by business objects 320. Once the XML payload is received by the action servlet 314, a decoder request is transmitted at 350 to the XMS decoder 318, and the decoder 318 acts at 352 to convert the XML-formatted request or message back to its original state as a data object or data bean. The action servlet 314 uses the type or class name from the decoder 318 and the mapping file obtained from the earlier reading of the configuration file to determine if a mapping or match between the data object and a business object can be obtained or identified. If not, an error mess is returned to the requesting client. If a mapping is obtained, the action servlet forwards the received data object to the mapped business object 320 as shown at 354 with the set data object method.

Once the business object 320 receives the data object, it proceeds to decompose the data object to process the client request. The action servlet 314 then retrieves the business object 320 response as a data object as shown at 356 with the get data object method and as further described at 360. The data object is passed at 362 to the decoder 318 which functions as described at 364 to convert the response data object from the business object 320 into XML (i.e., into an XML message or document). At 370, the method 300 continues with a connection being made with the controller servlet 310 in the client tier, and the XML-formatted response is sent to its return destination URL (i.e., the URL of the controller servlet 310) via the security service (not shown). The client controller 310 act at 374 forwards the returned XML response to the encoder 312 where it is converted back to its original data object state. The data object is then forwarded to the requesting client, such as after rendering (e.g., by a JSP or other servlet).

As discussed previously, the method 300 is effective for use within an internal or a secure network, such as within a single enterprises's WAN, LAN, or other network or even within a single box or computer device. In such an embodiment, a security service would not be utilized or provided. The method 300 is modified for this embodiment by setting the client tier target URL (such as web.xml setting) to equal the URL of the action servlet 314. This also means that an application enabled for internal or private use only but for use within an XMS-based system or process can later be easily migrated to the edge or for use in a network such as those shown in FIGS. 1 and 2 that provide controlled public or external/remote access by changing the target URL (or web.xml setting) to the URL of the security service.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The XMS systems and methods described herein may implement encryption of messages and content transferred as markup requests/responses such as by provided a cipher class to perform XOR-encryption/decryption of strings that could be used to allow sensitive data such as passwords to be scrambled in the markup messages so as not to be exposed as clear text. Additional security may be provided with XMS systems and methods that use HTTPS or other secure protocols to encrypt XML or other markup language payloads to provide point-to-point security between two communication applications.

I claim:

1. A computer-based method for secure messaging between applications, comprising:
    with a first application running on a computing device, converting a client request in an object state to a network message, wherein the converting is performed using a data definition;
    opening a network connection between the first application and a second application running on a computing device, wherein the second application controls access to a plurality of business application objects;
    transmitting the network message to the second application;
    with the second application, mapping the network message to one of the business application objects based on a data object type of the network message;
    converting the network message back to the client request in the object state;
    when the mapping is finished, passing the converted client request to the mapped one of the business application objects for processing.

2. The method of claim 1, wherein the mapping comprises reading a configuration file defining a plurality of pairings between a data object type and a business process identifier associated with the one of the business application objects, determining the data object type of the network message, and retrieving one of the business process identifiers using the determined data object type.

3. The method of claim 2, further comprising generating and returning an error to the first application when the retrieving fails when the determined data object type is not present in the plurality of pairings defined in the configuration file.

4. The method of claim 1, further comprising generating a response in an object state to the client request with the mapped business process operating on the converted client request.

5. The method of claim 4, further comprising converting the response from the object state into a response network message, transmitting the response network message to the first application, and with the first application, converting the response network message back into the response with the object state as generated by the mapped business process.

6. The method of claim 1, wherein the network message and the response network message for formatted as eXtensible Markup Language (XML) messages and the data definition is a document type definition (DTD).

7. The method of claim 1, wherein the first application is presented on an edge of computer network that is accessible by a digital communications network and the second application is an internal application and wherein a security service is provided between the first and second applications for processing the network message to determine whether receipt by the second application is allowable based on a set of security rules.

8. The method of claim 1, wherein the client request and the converted client request are data objects and the mapped one of the business application objects is a business object, the data objects and the business object are configured according to an object-oriented programming language.

9. A computing apparatus for processing incoming messages from an edge application, comprising:
    a configuration file stored in memory comprising a mapping of a plurality of data object types to a plurality of business objects;
    a decoder converting a message from a markup language format to a data object state; and
    a messaging action manager connected to a digital communications network receiving a client request, matching the client request to only one of the business objects based on the mapping defined in the configuration file and a determined data object type of the client request, calling the decoder to convert the client request into a data object state, passing the converted client request to the one matched business object, wherein the passing includes, after completion of the matching, the messaging action manager dynamically loading, initializing, and calling the mapped business object.

10. The computing apparatus of claim 9, wherein the one matched business object processes the converted client request to generate a response in a data object state, wherein the decoder is further operable to convert a message in a data object state into a message having a markup language format, and wherein the messaging action manager receives the generated response, calls the decoder to convert the received response into a response message having the markup language format, and transmitting the response message over the digital communications network to a source of the received request.

11. The computing apparatus of claim 10, wherein the client request is an XML message and the decoder converts the received response and the client request using a single data definition.

12. A secure messaging method comprising:
    storing a mapping file in a memory that defines a plurality of data object type and business object pairs;
    establishing a network communication, connect between a first and a second application running on computing devices;

with the second application, receiving a request message from the first application configured for transmittal over the network communication connection based on a data definition;

determining a data object type for the received request message;

using the mapping file to identify a business object corresponding to the determined data object type; and passing the received request message to the identified business object.

13. The method of claim 12, wherein the received request message is a markup language message configured according to the data definition.

14. The method of claim 13, further comprising converting the received request message into a data object of the determined data object type prior to the passing to the identified business object.

15. The method of claim 14, wherein the markup language message is an XML message and the data definition is a document type definition.

16. The method of claim 12, further comprising receiving a network-protocol client request at an edge application, processing the network-protocol client request to generate a request data object, and using the data definition converting the request data object into the request message for transmittal over the network communication connection.

17. The method of claim 16, further comprising proving a security service in the network communication connection and validating the request message with the security service prior to delivery to the second application.

18. The method of claim 17, further comprising transmitting the request message to the security service from the first application and from the security service to the second application using HTTP or HTTPS tunneling.

19. The method of claim 12, further comprising operating the identified business object to generate a response data object from the received client request, converting the response data object into a response message for transmittal over the network communication connecting using the data definition, and transmitting the response message to the second application.

20. The method of claim 19, further comprising receiving the response message at the first application, converting the received response message back to the response data object, and generating a client response by processing the response data object with the first application.

* * * * *